United States Patent
Hsin et al.

(10) Patent No.: US 9,608,541 B2
(45) Date of Patent: Mar. 28, 2017

(54) DC-TO-AC CONVERSION APPARATUS AND METHOD OF OPERATING THE SAME

(71) Applicant: DELTA ELECTRONICS, INC., Taoyuan County (TW)

(72) Inventors: Wei-Lun Hsin, Taoyuan County (TW); Hong-Yi Chen, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 18 days.

(21) Appl. No.: 14/728,072

(22) Filed: Jun. 2, 2015

(65) Prior Publication Data

US 2016/0226397 A1    Aug. 4, 2016

(30) Foreign Application Priority Data

Jan. 29, 2015    (TW) .............................. 104102990 A

(51) Int. Cl.
  *H02M 7/487*    (2007.01)
(52) U.S. Cl.
  CPC .................................. *H02M 7/487* (2013.01)
(58) Field of Classification Search
  CPC .... H02M 7/44; H02M 1/12; H02M 2001/007; H02M 7/538; H02M 3/33569; H02M 7/5387; H02M 7/521; H02M 7/487; H02H 7/122; G02M 7/53875
  USPC .......................... 363/95, 98, 132, 40, 41, 71
  See application file for complete search history.

(56) References Cited

U.S. PATENT DOCUMENTS

| | | | | |
|---|---|---|---|---|
| 5,499,178 A | * | 3/1996 | Mohan | ...................... H02J 3/01 307/105 |
| 7,710,752 B2 | * | 5/2010 | West | ....................... H02M 1/12 323/906 |
| 7,768,800 B2 | * | 8/2010 | Mazumder | ............ H02M 5/458 363/17 |

(Continued)

FOREIGN PATENT DOCUMENTS

| | | |
|---|---|---|
| EP | 2107672 | 10/2009 |
| EP | 2651025 | 10/2013 |

(Continued)

OTHER PUBLICATIONS

STIC EIC 2800 search report from searcher John DiGeronimo.*

(Continued)

*Primary Examiner* — Timothy J Dole
*Assistant Examiner* — Htet Z Kyaw
(74) *Attorney, Agent, or Firm* — Hauptman Ham, LLP

(57) ABSTRACT

A DC-to-AC conversion apparatus converts a DC input power source to a three-phase AC output power source. The DC-to-AC conversion apparatus includes an input capacitor assembly, a first conversion circuit, a second conversion circuit, and a control circuit. The input capacitor assembly is connected to the DC input power source, and has a neutral point. The neutral point is connected to a first phase sequence of the AC output power source. The first conversion circuit is connected a second phase sequence and a third phase sequence. The second conversion circuit is connected to the first phase sequence, the second phase sequence, and the third phase sequence. The control circuit generates a plurality of control signals to respectively control the first conversion circuit and the second conversion circuit, thus converting the DC input power source into the three-phase AC output power source.

20 Claims, 13 Drawing Sheets

(56) References Cited

U.S. PATENT DOCUMENTS

| | | | | |
|---|---|---|---|---|
| 8,154,893 B2* | 4/2012 | Iwata | ...................... | H02M 7/49 |
| | | | | 363/132 |
| 8,184,462 B2* | 5/2012 | Mabuchi | ................. | H02J 3/383 |
| | | | | 363/124 |
| 8,618,456 B2* | 12/2013 | Hinman | ................ | H02H 7/1222 |
| | | | | 250/203.4 |
| 8,625,307 B2* | 1/2014 | Iwata | ...................... | H02M 7/49 |
| | | | | 363/131 |
| 8,687,388 B2* | 4/2014 | Jang | .................... | H02M 1/4216 |
| | | | | 363/44 |
| 8,885,375 B2 | 11/2014 | Ku et al. | | |
| 8,891,261 B2* | 11/2014 | Jang | .................... | H02M 1/4216 |
| | | | | 363/44 |
| 9,019,736 B2* | 4/2015 | Lee | ..................... | H02M 7/5387 |
| | | | | 363/131 |
| 9,209,626 B2* | 12/2015 | West | ..................... | H02M 1/126 |
| 9,219,423 B2* | 12/2015 | Lv | .......................... | H02M 1/088 |
| 9,281,738 B2* | 3/2016 | Zhou | .................... | H02M 1/126 |
| 9,300,225 B2* | 3/2016 | Ku | ........................... | H02M 7/48 |
| 9,306,474 B2* | 4/2016 | Chen | .................... | H02M 7/53873 |
| 9,344,005 B2* | 5/2016 | Ho | ........................ | H02M 7/493 |
| 9,450,512 B2* | 9/2016 | Bremicker | .............. | H02M 1/32 |
| 2010/0110742 A1* | 5/2010 | West | ........................ | H02H 3/16 |
| | | | | 363/132 |
| 2013/0114321 A1* | 5/2013 | Zhang | ..................... | H02M 7/44 |
| | | | | 363/132 |
| 2013/0329471 A1* | 12/2013 | Escobar | ................... | H02M 7/42 |
| | | | | 363/40 |
| 2014/0049998 A1 | 2/2014 | Casey et al. | | |
| 2014/0301124 A1* | 10/2014 | Wu | ......................... | H02M 7/49 |
| | | | | 363/132 |
| 2015/0042166 A1* | 2/2015 | Fujita | .................... | H02M 5/297 |
| | | | | 307/63 |
| 2016/0226397 A1* | 8/2016 | Hsin | ..................... | H02M 7/487 |

FOREIGN PATENT DOCUMENTS

| | | |
|---|---|---|
| JP | 2010-273438 | 12/2010 |
| TW | 201304385 | 1/2013 |

OTHER PUBLICATIONS

Office Action dated Sep. 3, 2015 from corresponding application No. TW 104102990.
Office Action dated Aug. 30, 2016 from corresponding application No. JP 2015-113359.
European search report dated Sep. 6, 2016 from corresponding application No. EP 15172287.3.
Hideaki Fujita et al., "Photovoltaic Power Conversion Circuit Using a Symmetric Boost Converter for Low-Voltage Distribution Systems", Energy Conversion Congress and Exposition (ECCE), 2014 IEEE, pp. 5607-5612.

* cited by examiner

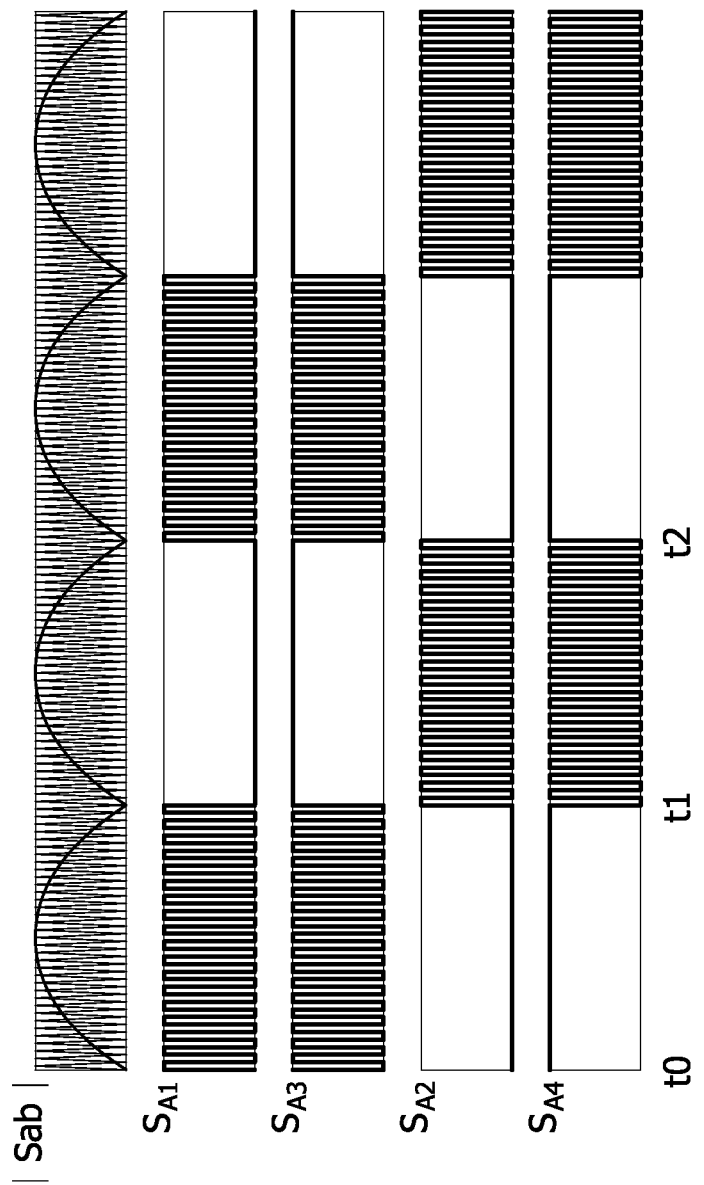

US 9,608,541 B2

DC-TO-AC CONVERSION APPARATUS AND METHOD OF OPERATING THE SAME

BACKGROUND

1. Technical Field

The present disclosure relates generally to a DC-to-AC conversion apparatus and a method of operating the same, and more particularly to a DC-to-AC conversion apparatus and a method of operating the same which are applied to a solar photovoltaic power generation system.

2. Description of Related Art

Reference is made to FIG. 1 and FIG. 2 are a circuit diagram and a schematic block diagram of a control circuit of a prior art DC-to-AC power conversion system, respectively. The DC-to-AC power conversion system receives a DC input voltage Sdc and converts the DC input voltage Sdc into a three-phase AC output voltage Sac. More specifically, the DC-to-AC power conversion system includes a three-phase three-arm inverter. As shown in FIG. 1, the symbol labeled "a" represents a-phase of the three-phase system, the symbol labeled "b" represents b-phase of the three-phase system, and the symbol labeled "c" represents c-phase of the three-phase system.

The traditional three-phase three-arm inverter needs more switch components, for example, one phase thereof needs at least four switch components, such as Sa1, Sa2, Sa3, and Sa4 in the phase a. In addition, a disadvantage of a larger leakage current exists when the three-phase three-arm inverter is controlled and operated (as shown in FIG. 2).

Accordingly, it is desirable to provide a DC-to-AC conversion apparatus to omit the circuit components in one phase so as to reduce the number of switches, output inductors, and further to maintain the voltage across the capacitors at the DC input side accurately equal to a half of the DC input voltage.

SUMMARY

An object of the present disclosure is to provide a DC-to-AC conversion apparatus to solve the above-mentioned problem. Accordingly, the DC-to-AC conversion apparatus is configured to convert a DC input power source into a three-phase AC output power source. The DC-to-AC conversion apparatus includes an input capacitor assembly, a first conversion circuit, and a second conversion circuit. The input capacitor assembly is connected to the DC input power source and has a neutral point. The neutral point is connected to a first phase sequence of the three-phase AC output power source to provide a first path. The first conversion circuit has a first bridge arm and a second bridge arm. The first bridge arm has a first upper bridge switch unit and a first lower bridge switch unit connected in series to the first upper bridge switch unit at a first connection point. The second bridge arm has a second upper bridge switch unit and a second lower bridge switch unit connected in series to the second upper bridge switch unit at a second connection point. The first connection point is connected to a second phase sequence of the three-phase AC output power source to provide a second path and the second connection point is connected to a third phase sequence of the three-phase AC output power source to provide a third path. The second conversion circuit has a third bridge arm and a fourth bridge arm. The third bridge arm has a third upper bridge switch unit and a third lower bridge switch unit connected in series to the third upper bridge switch unit to form a first in-series path with a first terminal and a second terminal. The first terminal is connected to the second path. The fourth bridge arm has a fourth upper bridge switch unit and a fourth lower bridge switch unit connected in series to the fourth upper bridge switch unit to form a second in-series path with a first terminal and a second terminal. The first terminal is connected to the third path. The second terminal of the first in-series path is connected to the second terminal of the second in-series path and connected to the first path. The control circuit is configured to generate a plurality of control signals to control the first conversion circuit and the second conversion circuit so as to convert the DC input power source into the three-phase AC output power source.

Another object of the present disclosure is to provide a method of operating a DC-to-AC conversion apparatus configured to convert a DC input power source into a three-phase AC output power source to solve the above-mentioned problem. Accordingly, the method includes (a) providing an input capacitor assembly connected to the DC input power source, the input capacitor assembly having a neutral point; wherein the neutral point is connected to a first phase sequence of the three-phase AC output power source to provide a first path; (b) providing a first conversion circuit, the first conversion circuit having a first bridge arm and a second bridge arm; wherein the first bridge arm has a first upper bridge switch unit and a first lower bridge switch unit connected in series to the first upper bridge switch unit at a first connection point; the second bridge arm has a second upper bridge switch unit and a second lower bridge switch unit connected in series to the second upper bridge switch unit at a second connection point; wherein the first connection point is connected to a second phase sequence of the three-phase AC output power source to provide a second path and the second connection point is connected to a third phase sequence of the three-phase AC output power source to provide a third path; (c) providing a second conversion circuit, the second conversion circuit having a third bridge arm and a fourth bridge arm; wherein the third bridge arm has a third upper bridge switch unit and a third lower bridge switch unit connected in series to the third upper bridge switch unit to form a first in-series path with a first terminal and a second terminal, and the first terminal is connected to the second path; the fourth bridge arm has a fourth upper bridge switch unit and a fourth lower bridge switch unit connected in series to the fourth upper bridge switch unit to form a second in-series path with a first terminal and a second terminal, and the first terminal is connected to the third path; wherein the second terminal of the first in-series path is connected to the second terminal of the second in-series path and connected to the first path; and (d) providing a control circuit to generate a plurality of control signals to control the first conversion circuit and the second conversion circuit so as to convert the DC input power source into the three-phase AC output power source.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

FIG. 6 is a schematic waveform graph of control signals for controlling the DC-to-AC conversion apparatus according to the present disclosure;

DETAILED DESCRIPTION

Figure 1:
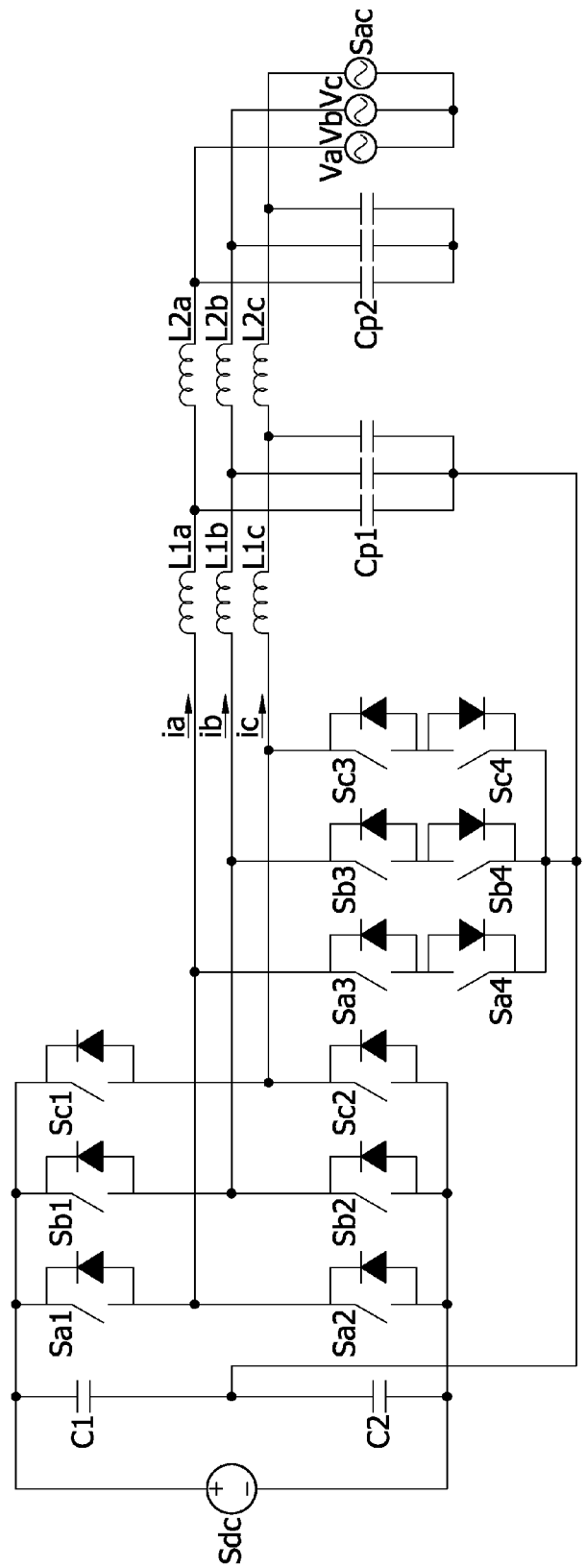
FIG. 1 is a circuit diagram of a prior art DC-to-AC power conversion system.
Figure 2:
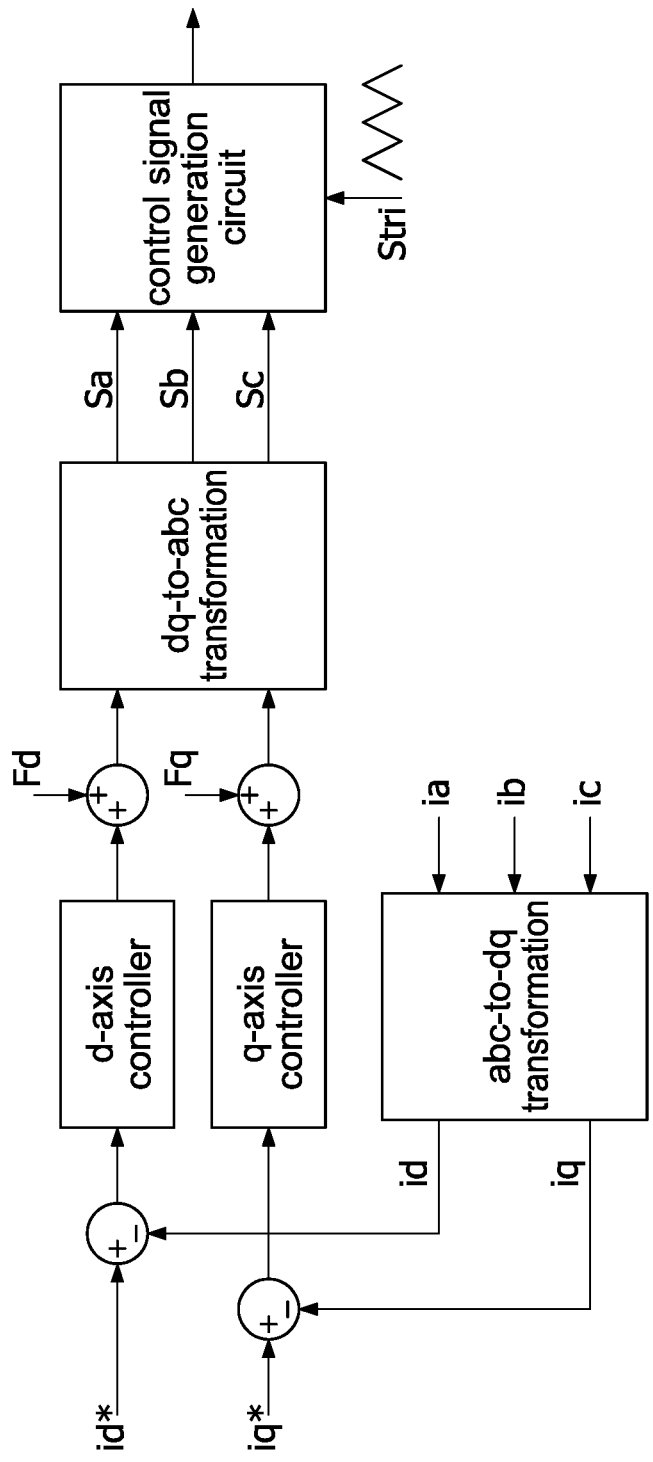
FIG. 2 is a schematic block diagram of a control circuit of the prior art DC-to-AC power conversion system.

Reference will now be made to the drawing figures to describe the present disclosure in detail.

Figure 3:
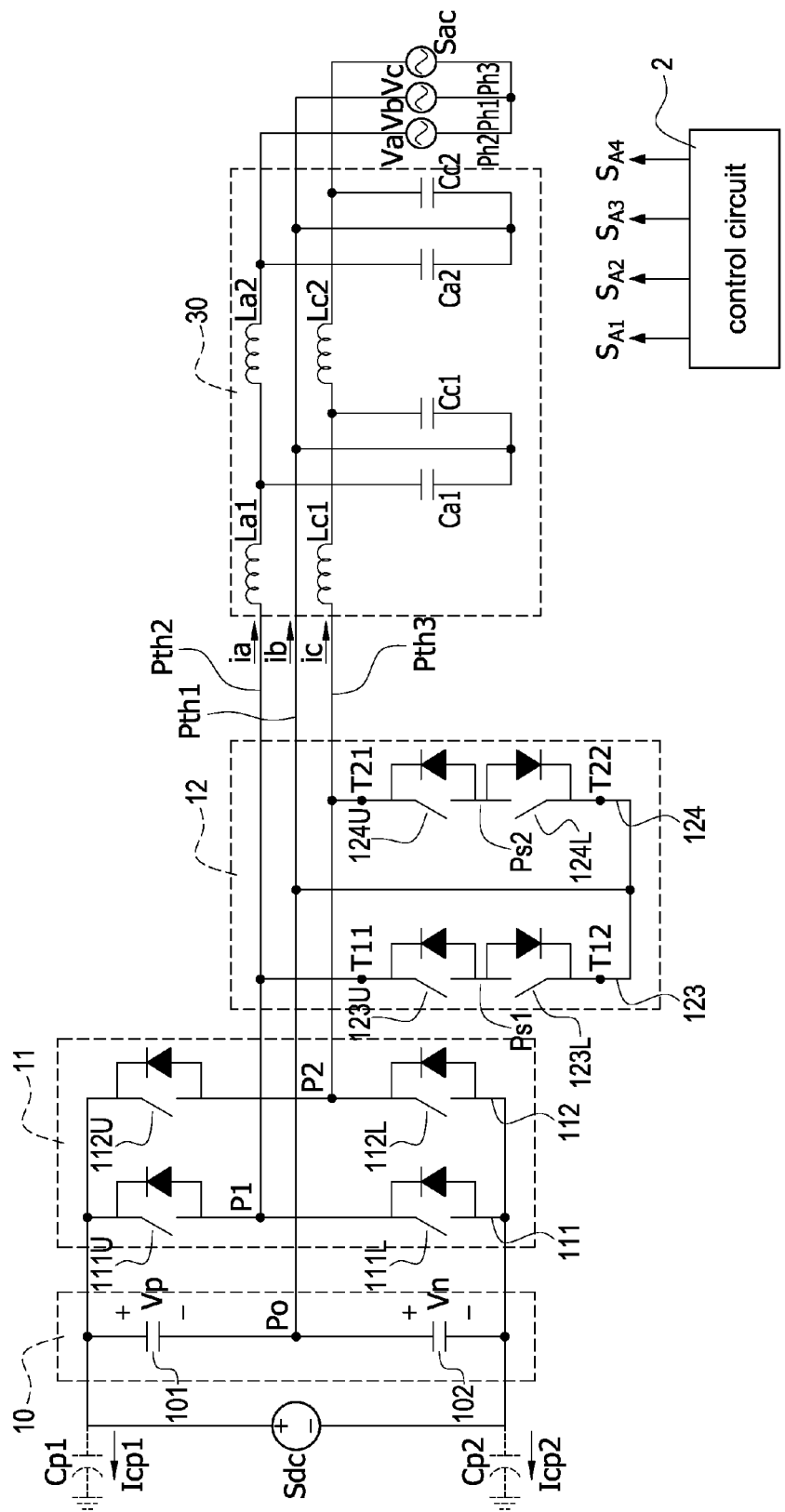
FIG. 3 is a circuit diagram of a DC-to-AC conversion apparatus according to a preferred embodiment of the present disclosure.

Reference is made to FIG. 3 which is a circuit diagram of a DC-to-AC conversion apparatus according to a preferred embodiment of the present disclosure. The DC-to-AC conversion apparatus is provided to convert a DC input power source Sdc into a three-phase AC output power source Sac. The DC-to-AC conversion apparatus includes an input capacitor assembly 10, a first conversion circuit 11, a second conversion circuit 12, and a control circuit 2. The input capacitor assembly 10 has a first capacitor 101 and a second capacitor 102. The first capacitor 101 is connected in series to the second capacitor 102 to receive the DC input power source Sdc. In particular, the first capacitor 101 and the second capacitor 102 are connected to a neutral point Po to maintain a voltage across the first capacitor 101 and a voltage across the second capacitor 102 are equal to a half of a DC input voltage provided by the DC input power source Sdc. In particular, the voltage across the first capacitor 101 is a first DC voltage Vp and the voltage across the second capacitor 102 is a second DC voltage Vn.

The three-phase AC output power source Sac has three phase sequences, namely, a first phase sequence Ph1, a second phase sequence Ph2, and a third phase sequence Ph3. For convenience, the first phase sequence Ph1 is corresponding to a b-phase voltage Vb, the second phase sequence Ph2 is corresponding to an a-phase voltage Va, and the third phase sequence Ph3 is corresponding to a c-phase voltage Vc. For convenience, the three-phase AC output power source Sac is balanced three-phase power source for example. Especially, the neutral point Po is connected to the first phase sequence Ph1 of the three-phase AC output power source Sac, that is, the neutral point Po is connected to the b-phase voltage Vb to provide a first path Pth1.

The first conversion circuit 11 includes a first bridge arm 111 and a second bridge arm 112. The first bridge arm 111 has a first upper bridge switch unit 111U and a first lower bridge switch unit 111L connected in series to the first upper bridge switch unit 111U. The first upper bridge switch unit 111U is connected to the first lower bridge switch unit 111L at a first connection point P1. The second bridge arm 112 has a second upper bridge switch unit 112U and a second lower bridge switch unit 112L connected in series to the second upper bridge switch unit 112U. The second upper bridge switch unit 112U is connected to the second lower bridge switch unit 112L at a second connection point P2. In addition, the first connection point P1 is connected to the second phase sequence Ph2 of the three-phase AC output power source Sac, that is, the first connection point P1 is connected to the a-phase voltage Va to provide a second path Pth2. The second connection point P2 is connected to the third phase sequence Ph3 of the three-phase AC output power source Sac, that is, the second connection point P2 is connected to the c-phase voltage Vc to provide a third path Pth3.

The second conversion circuit 12 includes a third bridge arm 123 and a fourth bridge arm 124. The third bridge arm 123 has a third upper bridge switch unit 123U and a third lower bridge switch unit 123L connected in series to the third upper bridge switch unit 123U to form a first in-series path Ps1 with a first terminal T11 and a second terminal T12. The first terminal T11 is connected to the second path Pth2. The fourth bridge arm 124 has a fourth upper bridge switch unit 124U and a fourth lower bridge switch unit 124L connected in series to the fourth upper bridge switch unit 124U to form a second in-series path Ps2 with a first terminal T21 and a second terminal T22. The first terminal T21 is connected to the third path Pth3. In addition, the second terminal T12 of the first in-series path Ps1 is connected to the second terminal T22 of the second in-series path Ps2, and then connected to the first path Pth1.

The control circuit 2 is provided to generate a plurality of control signals to control the first conversion circuit 11 and the second conversion circuit 12 so as to reduce leakage current caused by parasitic capacitance voltage.

More specifically, the first bridge arm 111 of the first conversion circuit 11 is essentially arranged to the third bridge arm 123 of the second conversion circuit 12, that is, the first bridge arm 111 and the third bridge arm 123 are corresponding to the a-phase voltage Va. Similarly, the second bridge arm 112 of the first conversion circuit 11 is essentially arranged to the fourth bridge arm 124 of the second conversion circuit 12, that is, the second bridge arm 112 and the fourth bridge arm 124 are corresponding to the c-phase voltage Vc.

In addition, the DC-to-AC conversion apparatus further includes an output filtering circuit 30. The output filtering circuit 30 includes a first output inductor assembly, a second output inductor assembly, a first output capacitor assembly, and a second output capacitor assembly. The first output inductor assembly has a first inductor La1 connected on the second path Pth2 and a second inductor Lc1 connected on the third path Pth3. The second output inductor assembly has a third inductor La2 connected on the second path Pth2 and a fourth inductor Lc2 connected on the third path Pth3. In particular, the first inductor La1 is connected in series to the third inductor La2 and the second inductor Lc1 is connected in series to the fourth inductor Lc2.

The first output capacitor assembly has a first capacitor Ca1 connected on the second path Pth2 and a second capacitor Cc1 connected on the third path Pth3. The second output capacitor assembly has a third capacitor Ca2 connected on the second path Pth2 and a fourth capacitor Cc2 connected on the third path Pth3.

Figure 4A:
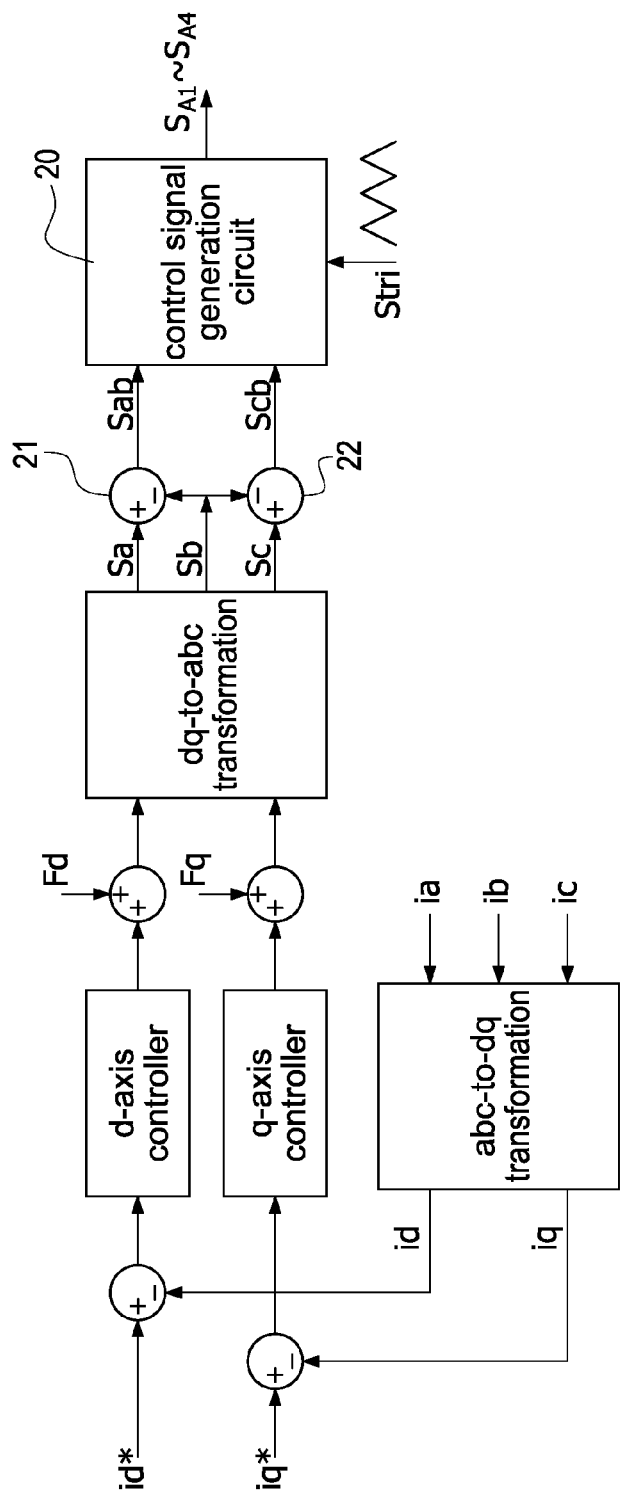
FIG. 4A is a schematic block diagram of a control circuit of the DC-to-AC conversion apparatus according to a first embodiment of the present disclosure.

Besides the circuit topology mentioned above, the corresponding control strategies are disclosed as follows. Reference is made to FIG. 4A which is a schematic block diagram of a control circuit of the DC-to-AC conversion apparatus according to a first embodiment of the present disclosure.

In the present disclosure, it is to use phase-to-phase signals as reference signals for control strategies to be different from the phase signals separately used for conventional control strategies. As shown in FIG. 3, the b-phase voltage Vb corresponding to the first phase sequence Ph1 is directly connected to the neutral point Po at the DC input side via the first path Pth1. For the circuit topologies of the present disclosure, an a-b phase signal Sab and a c-b phase signal Scb are as reference signals to generate a plurality of control signals (described in detail below). In particular, the a-b phase signal Sab is generated by subtracting the b-phase signal Sb from the a-phase signal Sa, namely, Sab=Sa−Sb. The c-b phase signal Scb is generated by subtracting the b-phase signal Sb from the c-phase signal, namely, Scb=Sc−Sb.

In a similar way, the reference signals are a b-a phase signal Sba and a c-a phase signal Sca if the a-phase voltage Va of the second phase sequence Ph2 is directly connected to the neutral point Po via the second path Pth2. In addition, the reference signals are an a-c phase signal Sac and a b-c phase signal Sbc if the c-phase voltage Vc of the third phase sequence Ph3 is directly connected to the neutral point Po via the third path Pth3. Accordingly, the corresponding reference signals are used for the different circuit topologies to generate the control signals.

Referring to FIG. 4A, the control structure is provided to convert an a-phase current is flowing through the second path Pth2, a b-phase current ib flowing through the first path Pth1, and a c-phase current ic flowing through the third path Pth3 into the a-phase signal Sa, the b-phase signal Sb, and the c-phase signal Sc, respectively. More specifically, the three phase currents ia, ib, ic are converted and calculated by the d-q transformation (a-b-c to d-q) to simplify the complexity of current controls. Finally, the three phase signals Sa, Sb, Sc can be acquired by the inverse d-q transformation (d-q to a-b-c). However, the d-q transformation and the inverse d-q transformation are commonly used in the power system. Hence, the detail (description) is omitted here for conciseness.

Especially, the three phase signals Sa, Sb, Sc are not individually used to be the reference signals to generate the control signals. On the contrary, the a-phase signal Sa and the b-phase signal Sb are inputted to a first arithmetic unit 21 to generate the a-b phase signal Sab by subtracting the b-phase signal Sb from the a-phase signal Sa by the first arithmetic unit 21. Similarly, the c-phase signal Sc and the b-phase signal Sb are inputted to a second arithmetic unit 22 to generate the c-b phase signal Scb by subtracting the b-phase signal Sb from the c-phase Sc by the second arithmetic unit 22. Accordingly, the a-b phase signal Sab, the c-b phase signal Scb, and a triangular carrier signal Stri are further inputted to a control signal generation circuit 20 to generate the control signals for controlling the first conversion circuit 11 and the second conversion circuit 12 (described in detail below).

Figure 4B:
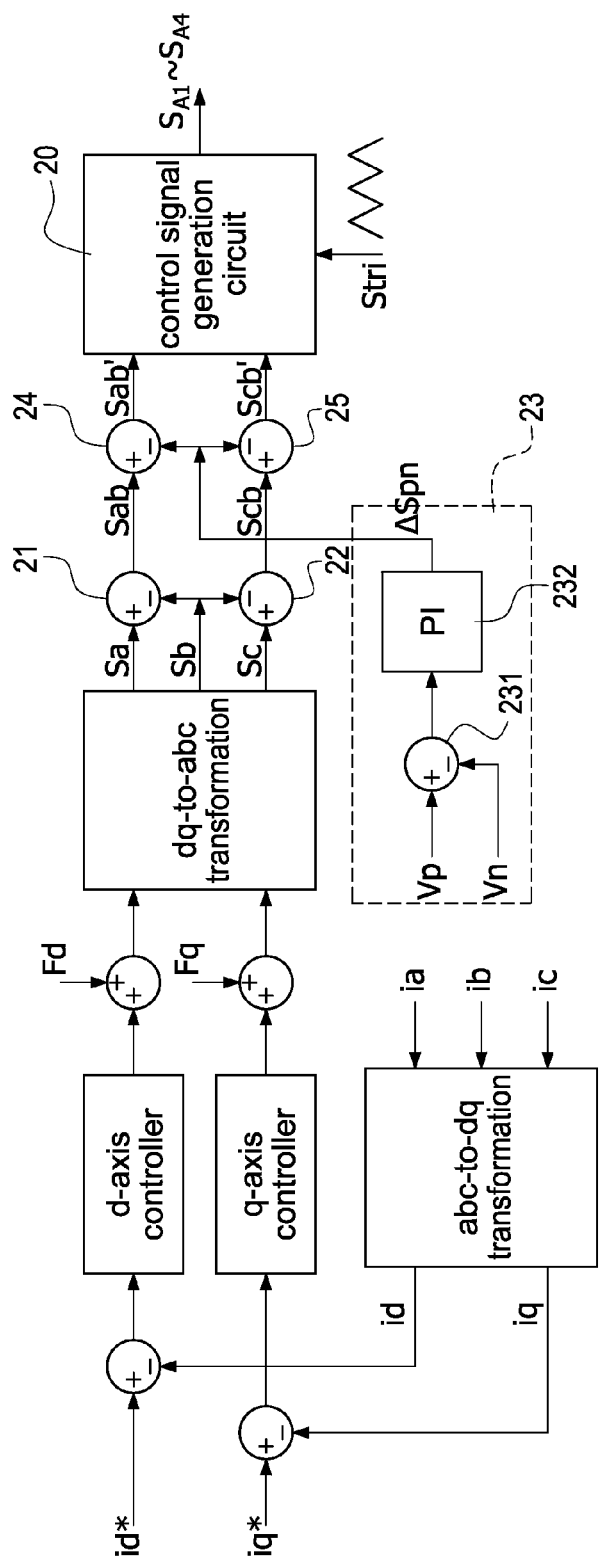
FIG. 4B is a schematic block diagram of the control circuit of the DC-to-AC conversion apparatus according to a second embodiment of the present disclosure.

Reference is made to FIG. 4B which is a schematic block diagram of the control circuit of the DC-to-AC conversion apparatus according to a second embodiment of the present disclosure. The difference major between the second embodiment and the first embodiment shown in FIG. 4A is that the control circuit 2 shown in FIG. 4B further has a balance circuit 23, a fourth arithmetic unit 24, and a fifth arithmetic unit 25. The balance circuit 23 has a third arithmetic unit 231 and a proportional-integral (PI) control unit 232. The third arithmetic unit 231 receives the first DC voltage Vp and the second DC voltage Vn at the DC input side and generates a voltage difference by subtracting the second DC voltage Vn from the first DC voltage Vp. Furthermore, the PI control unit 232 receives the voltage difference to generate a voltage difference signal $\Delta Spn$ by executing a proportional and integral operation to the voltage difference.

The fourth arithmetic unit 24 receives the a-b phase signal Sab and the voltage difference signal $\Delta Spn$ to generate an a-b phase modification signal Sab' by subtracting the voltage difference signal $\Delta Spn$ from the a-b phase signal Sab. Similarly, the fifth arithmetic unit 25 receives the c-b phase signal Scb and the voltage difference signal $\Delta Spn$ to generate a c-b phase modification signal Scb' by subtracting the voltage difference signal $\Delta Spn$ from the c-b phase signal Scb. In other words, the balance circuit 23 operates and converts the first DC voltage Vp and the second DC voltage Vn to generate the voltage difference signal $\Delta Spn$ for voltage compensation between the two DC voltages Vp, Vn. Furthermore, the fourth arithmetic unit 24 and the fifth arithmetic unit 25 calculate and combine the voltage compensation to the a-b phase signal Sab and the c-b phase signal Scb to acquire the a-b phase modification signal Sab' and the c-b phase modification signal Scb'. The a-b phase modification signal Sab' and the c-b phase modification signal Scb' are as reference signals to generate a plurality of control signals so as to control first conversion circuit 11 and the second conversion circuit 12, thus maintaining the voltage across the first capacitor 101 and the voltage across the second capacitor 102 accurately equal to a half of the DC input voltage.

Figure 5:
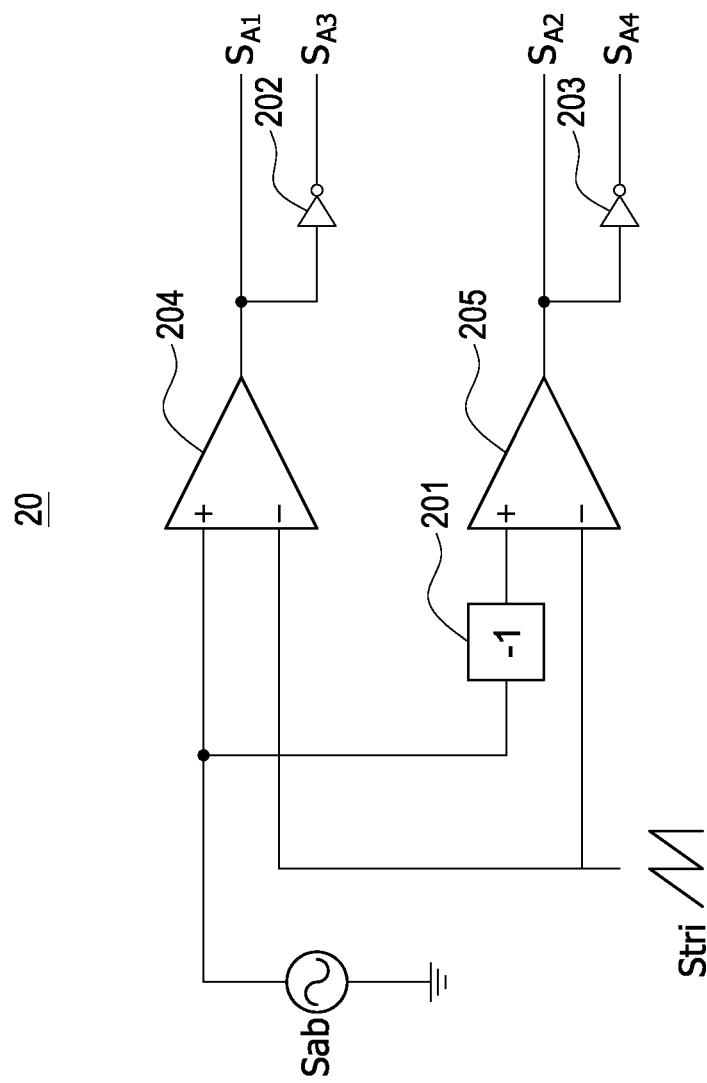
FIG. 5 is a circuit diagram of a control signal generation circuit of the DC-to-AC conversion apparatus according to the present disclosure.

Reference is made to FIG. 5 which is a circuit diagram of a control signal generation circuit of the DC-to-AC conversion apparatus according to the present disclosure. The control signal generation circuit 20 includes a signal inverting unit 201, a first NOT gate unit 202, a second NOT gate unit 203, a first comparison unit 204, and a second comparison unit 205. The first comparison unit 204 has an inverting input terminal, a non-inverting input terminal, and an output terminal. The non-inverting input terminal receives the a-b phase signal Sab, the non-inverting input terminal receives the triangular carrier signal Stri, and the output terminal outputs a first control signal $S_{A1}$. In addition, the output terminal of the first comparison unit 204 is connected to the first NOT gate unit 202 to output a third control signal $S_{A3}$. In particular, the first control signal $S_{A1}$ and the third control signal $S_{A3}$ are the complementary high-frequency switching signals. Also, the triangular carrier signal Stri is a high-frequency carrier signal.

The second comparison unit 205 has an inverting input terminal, a non-inverting input terminal, and an output terminal. The non-inverting input terminal is connected to the signal inverting unit 201 to receive the a-b phase signal Sab, the inverting input terminal receives the triangular carrier signal Stri, and the output terminal outputs a second control signal $S_{A2}$. In addition, the output terminal of the second comparison unit 205 is connected to the second NOT gate unit 203 to output a fourth control signal $S_{A4}$. In particular, the second control signal $S_{A2}$ and the fourth control signal $S_{A4}$ are the complementary high-frequency switching signals.

As mentioned above, the a-b phase signal Sab and the c-b phase signal Scb are as the reference signals for the circuit structure that the b-phase voltage Vb corresponding to the first phase sequence Ph1 is directly connected to the neutral point Po at the DC input side via the first path Pth1. In other words, when the a-phase circuit needs to be controlled, the non-inverting input terminal of the first comparison unit 204 receives the a-b phase signal Sab so that the control signal generation circuit 20 generates the corresponding control signals $S_{A1}$-$S_{A4}$. Similarly, when the c-phase circuit needs to be controlled, the non-inverting input terminal of the first comparison unit 204 receives the c-b phase signal Scb so that the control signal generation circuit 20 generates the corresponding control signals SC1-SC4. The detailed operation of the DC-to-AC conversion apparatus will be described hereinafter as follows.

Reference is made to FIG. 6 which is a schematic waveform graph of control signals for controlling the DC-to-AC conversion apparatus according to the present disclosure. For convenience, the circuit structure shown in FIG. 6 is that the b-phase voltage Vb corresponding to the first phase sequence Ph1 is directly connected to the neutral point Po at the DC input side via the first path Pth1, and the a-b phase signal Sab is as the reference signal for controlling the a-phase circuit. More specifically, the control signal generation circuit 20 generates the control signals $S_{A1}$-$S_{A4}$ according to the a-b phase signal Sab, and the first control signal $S_{A1}$ is used to control the first upper bridge switch unit 111U of the first conversion circuit 11, the third control signal $S_{A3}$ is used to control the third upper bridge switch unit 123U of the second conversion circuit 12, the second control signal $S_{A2}$ is used to control the first lower bridge switch unit 111L of the first conversion circuit 11, and the fourth control signal $S_{A4}$ is used to control the third lower bridge switch unit 123L of the second conversion circuit 12.

In addition, the control signal generation circuit 20 generates the control signals SC1-SC4 according to the c-b phase signal Scb, and the control signals SC1-SC4 are used to correspondingly control the second upper bridge switch unit 112U and the second lower bridge switch unit 112L of the first conversion circuit 11 and the fourth upper bridge switch unit 124U and the fourth lower bridge switch unit 124L of the second conversion circuit 12. Because, the difference between the c-phase circuit control and the above-mentioned a-phase circuit control is not significant, the detail description is omitted here for conciseness.

Referring to FIG. 6, when the a-b phase signal Sab is under a positive half-cycle operation (during a time interval between time t0 and time t1), the first control signal $S_{A1}$ and the third control signal $S_{A3}$ are complementary high-frequency switching signals, the second control signal $S_{A2}$ is a low-level signal, and the fourth control signal $S_{A4}$ is a high-level signal. In particular, the first control signal $S_{A1}$ and the third control signal $S_{A3}$ are pulse-width modulation (PWM) signals. Especially, the switching frequency of the PWM signals is equal to the frequency of the triangular carrier signal Stri.

When the a-b phase signal Sab is under a negative half-cycle operation (during a time interval between time t1 and time t2), the second control signal $S_{A2}$ and the fourth control signal $S_{A4}$ are complementary high-frequency switching signals, the first control signal $S_{A1}$ is a low-level signal, and the third control signal $S_{A3}$ is a high-level signal. In particular, the second control signal $S_{A2}$ and the fourth control signal $S_{A4}$ are pulse-width modulation (PWM) signals. Especially, the switching frequency of the PWM signals is equal to the frequency of the triangular carrier signal Stri.

Figure 7A:
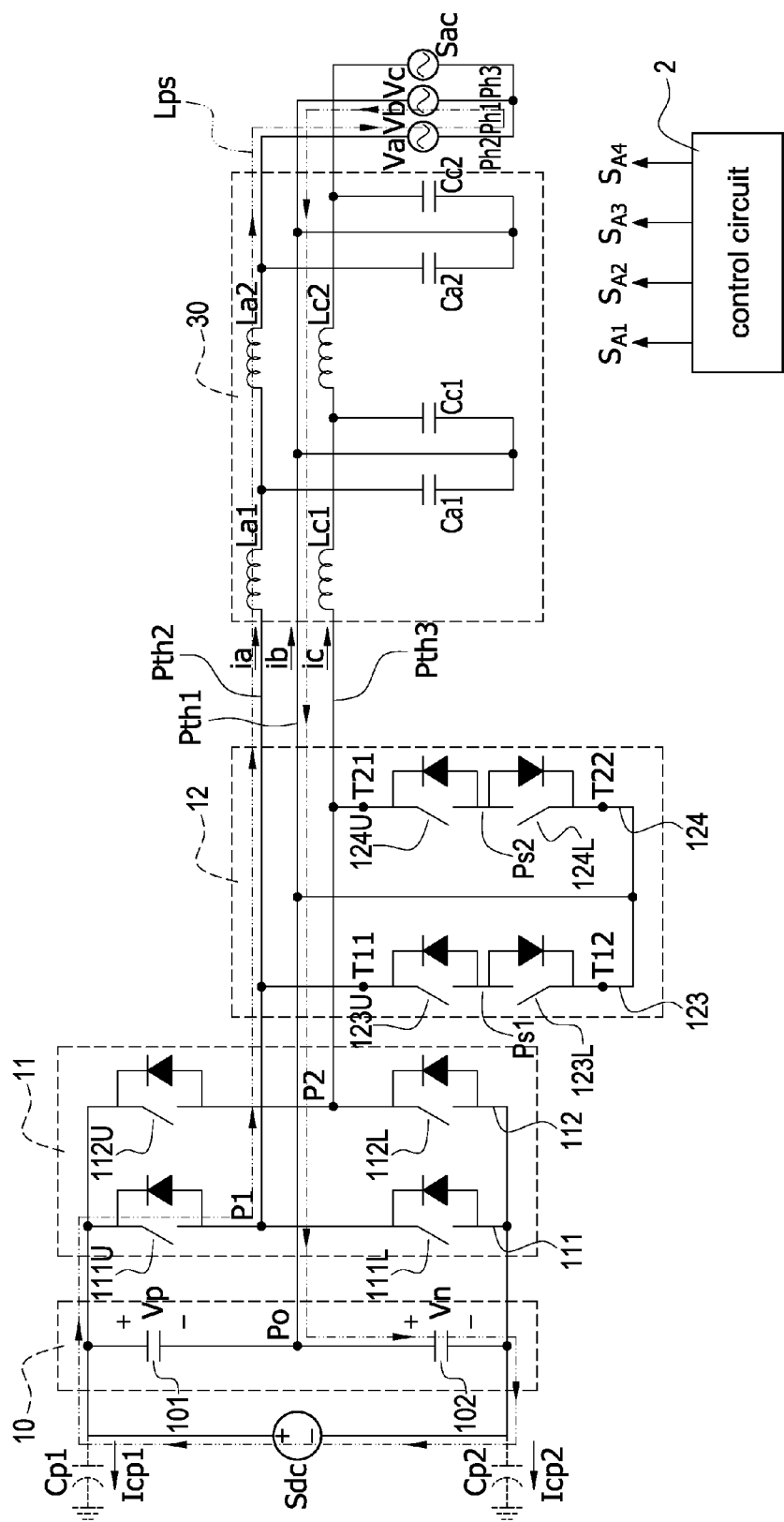
FIG. 7A is a circuit diagram of the DC-to-AC conversion apparatus under a positive half-cycle energy-storing operation of the a-b phase control according to the present disclosure.

Reference is made to FIG. 7A which is a circuit diagram of the DC-to-AC conversion apparatus under a positive half-cycle energy-storing operation of the a-b phase control according to the present disclosure. When the a-b phase signal Sab is under the positive half-cycle operation, the first upper bridge switch unit 111U is turned on by the first control signal $S_{A1}$ and the third upper bridge switch unit 123U is turned off by the third control signal $S_{A3}$ in the high-frequency switching manner. The first lower bridge switch unit 111L is turned off by the second control signal $S_{A2}$ in the low-level manner and the third lower bridge switch unit 123L is turned on by the fourth control signal $S_{A4}$ in the high-level manner. Accordingly, the first inductor La1 and the third inductor La2 are under the energy-storing operation through a positive half-cycle energy-storing loop Lps sequentially formed by the DC input power source Sdc, the first upper bridge switch unit 111U, the first inductor La1, the third inductor La2, the a-phase voltage Va, the b-phase voltage Vb, the neutral point Po, the second capacitor 102, and the DC input power source Sdc.

Figure 7B:
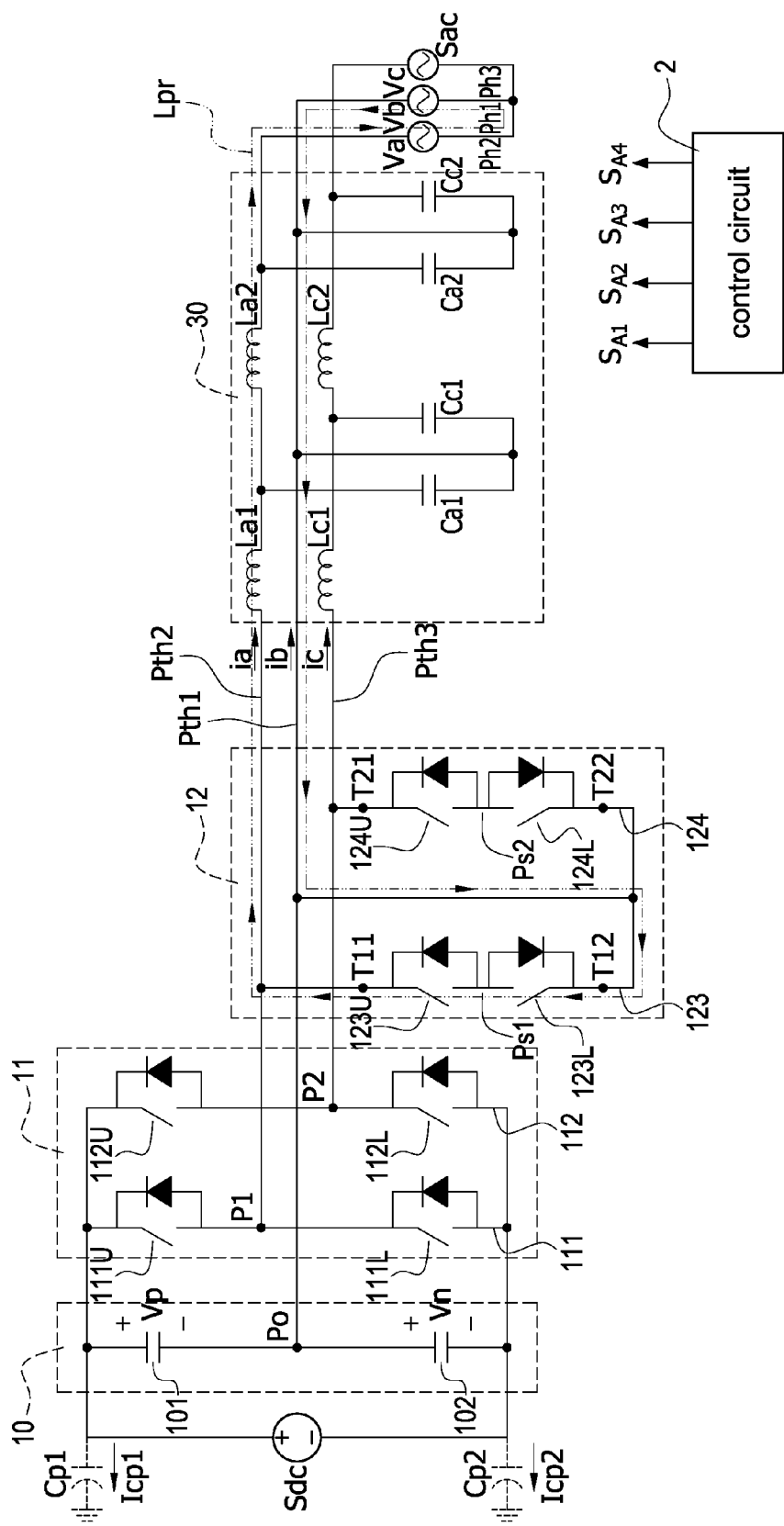
FIG. 7B is a circuit diagram of the DC-to-AC conversion apparatus under a positive half-cycle energy-releasing operation of the a-b phase control according to the present disclosure.

Reference is made to FIG. 7B which is a circuit diagram of the DC-to-AC conversion apparatus under a positive half-cycle energy-releasing operation of the a-b phase control according to the present disclosure. When the a-b phase signal Sab is under the positive half-cycle operation, the first upper bridge switch unit 111U is turned off by the first control signal $S_{A1}$ and the third upper bridge switch unit 123U is turned on by the third control signal $S_{A3}$ in the high-frequency switching manner. The first lower bridge switch unit 111L is turned off by the second control signal $S_{A2}$ in the low-level manner and the third lower bridge switch unit 123L is turned on by the fourth control signal $S_{A4}$ in the high-level manner. Accordingly, the first inductor La1 and the third inductor La2 are under the energy-storing operation through a positive half-cycle energy-releasing loop Lpr sequentially formed by the first inductor La1, the third inductor La2, the a-phase voltage Va, the b-phase voltage Vb, the third lower bridge switch unit 123L, the third upper bridge switch unit 123U, and the first inductor La1.

Figure 7C:
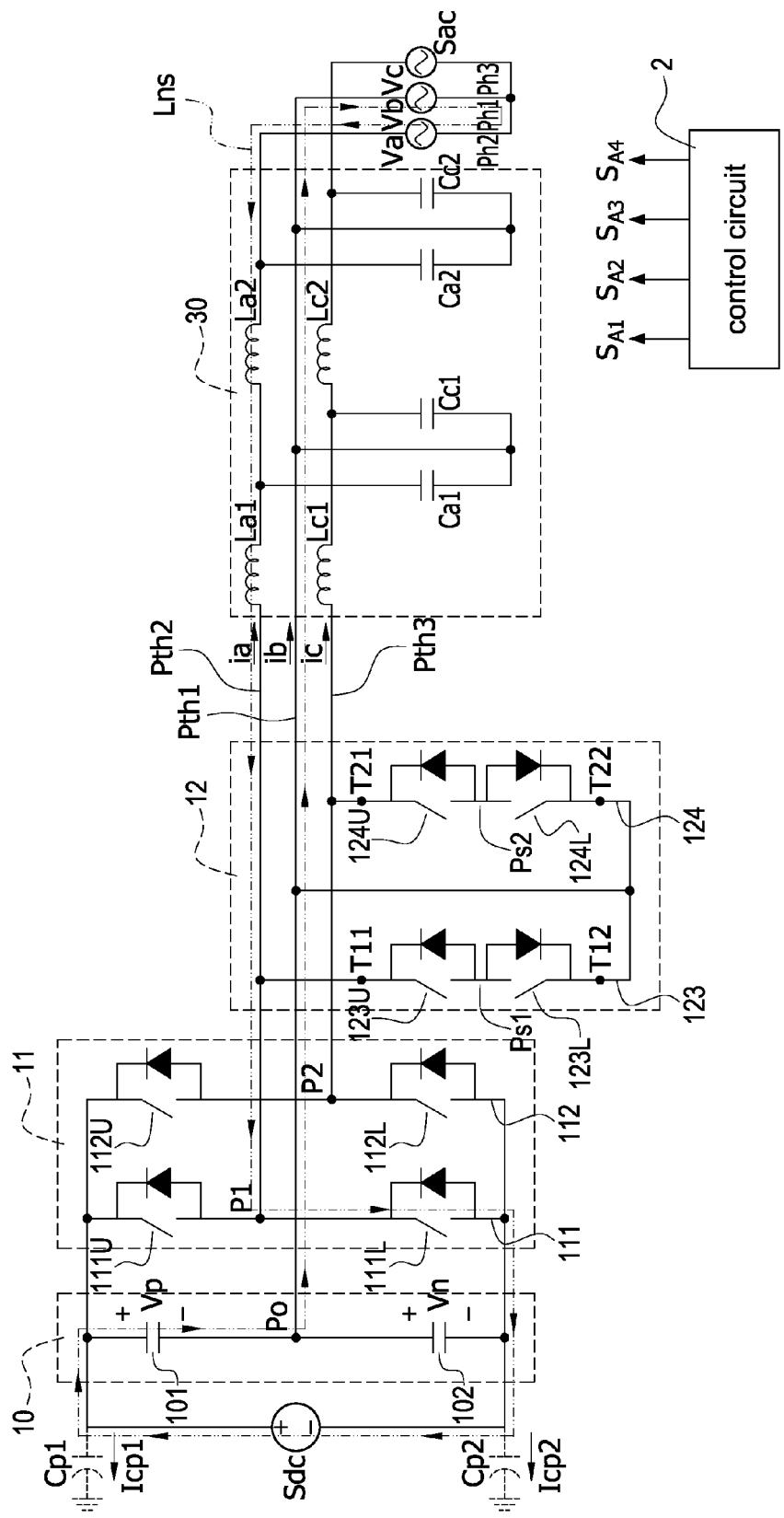
FIG. 7C is a circuit diagram of the DC-to-AC conversion apparatus under a negative half-cycle energy-storing operation of the a-b phase control according to the present disclosure.

Reference is made to FIG. 7C which is a circuit diagram of the DC-to-AC conversion apparatus under a negative half-cycle energy-storing operation of the a-b phase control according to the present disclosure. When the a-b phase signal Sab is under the negative half-cycle operation, the first lower bridge switch unit 111L is turned on by the second control signal $S_{A2}$ and the third lower bridge switch unit 123L is turned off by the fourth control signal $S_{A4}$ in the high-frequency switching manner. The first upper bridge switch unit 111U is turned off by the first control signal $S_{A1}$ in the low-level manner and the third upper bridge switch unit 123U is turned on by the third control signal $S_{A3}$ in the high-level manner. Accordingly, the first inductor La1 and the third inductor La2 are under the energy-storing operation through a negative half-cycle energy-storing loop Lns sequentially formed by the DC input power source Sdc, the first capacitor 101, the neutral point Po, the b-phase voltage Vb, the a-phase voltage Va, the third inductor La2, the first inductor La1, the first lower bridge switch unit 111L, and the DC input power source Sdc.

Figure 7D:
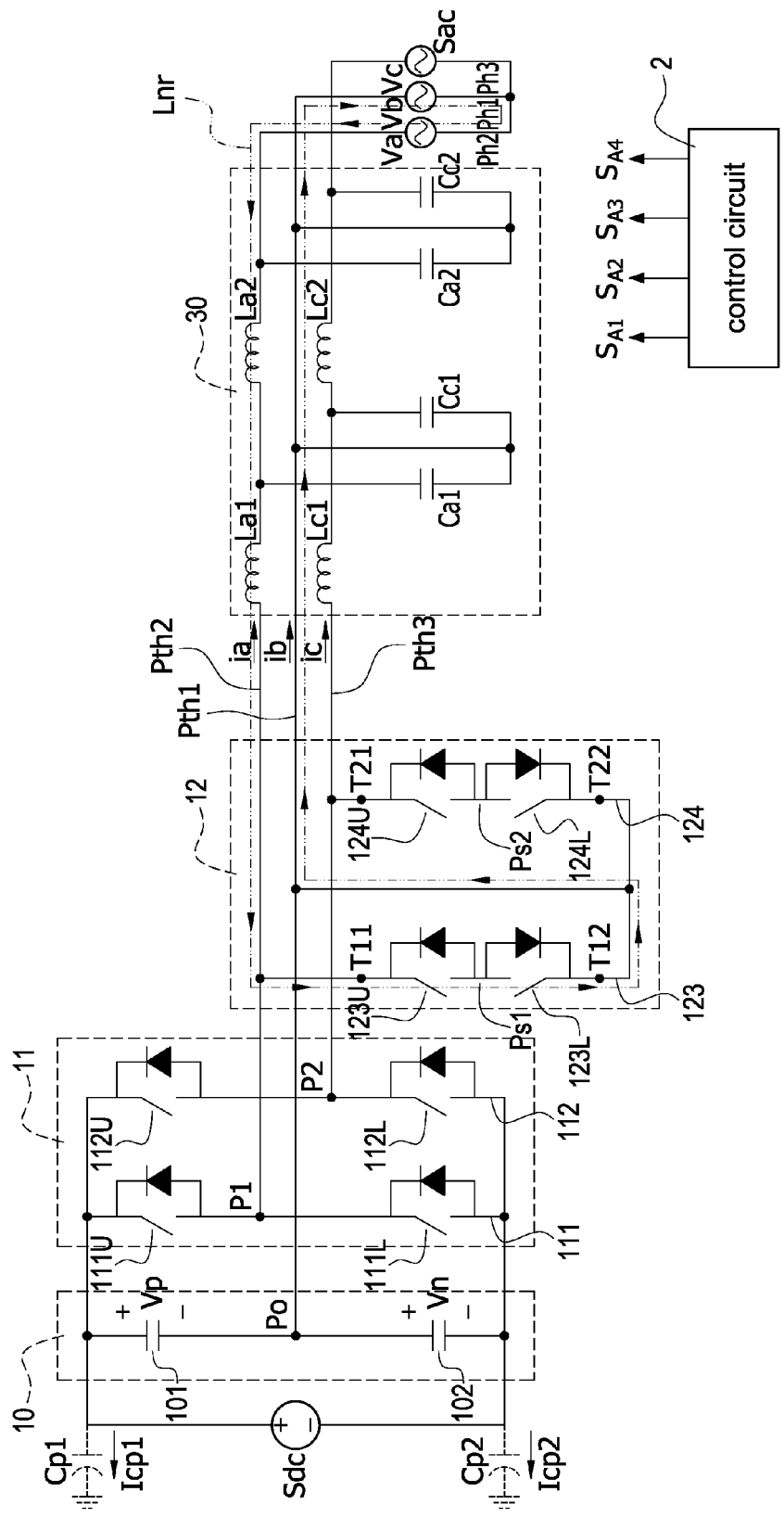
FIG. 7D is a circuit diagram of the DC-to-AC conversion apparatus under a negative half-cycle energy-releasing operation of the a-b phase control according to the present disclosure.

Reference is made to FIG. 7D which is a circuit diagram of the DC-to-AC conversion apparatus under a negative half-cycle energy-releasing operation of the a-b phase control according to the present disclosure. When the a-b phase signal Sab is under the negative half-cycle operation, the first lower bridge switch unit 111L is turned off by the second control signal $S_{A2}$ and the third lower bridge switch unit 123L is turned on by the fourth control signal $S_{A4}$ in the high-frequency switching manner. The first upper bridge switch unit 111U is turned off by the first control signal $S_{A1}$ in the low-level manner and the third upper bridge switch unit 123U is turned on by the third control signal $S_{A3}$ in the high-level manner. Accordingly, the first inductor La1 and the third inductor La2 are under the energy-releasing operation through a negative half-cycle energy-releasing loop Lnr sequentially formed by the third inductor La2, the first inductor La1, the third upper bridge switch unit 123U, the third lower bridge switch unit 123L, the b-phase voltage Vb, the a-phase voltage Va, and the third inductor La2.

Figure 8:
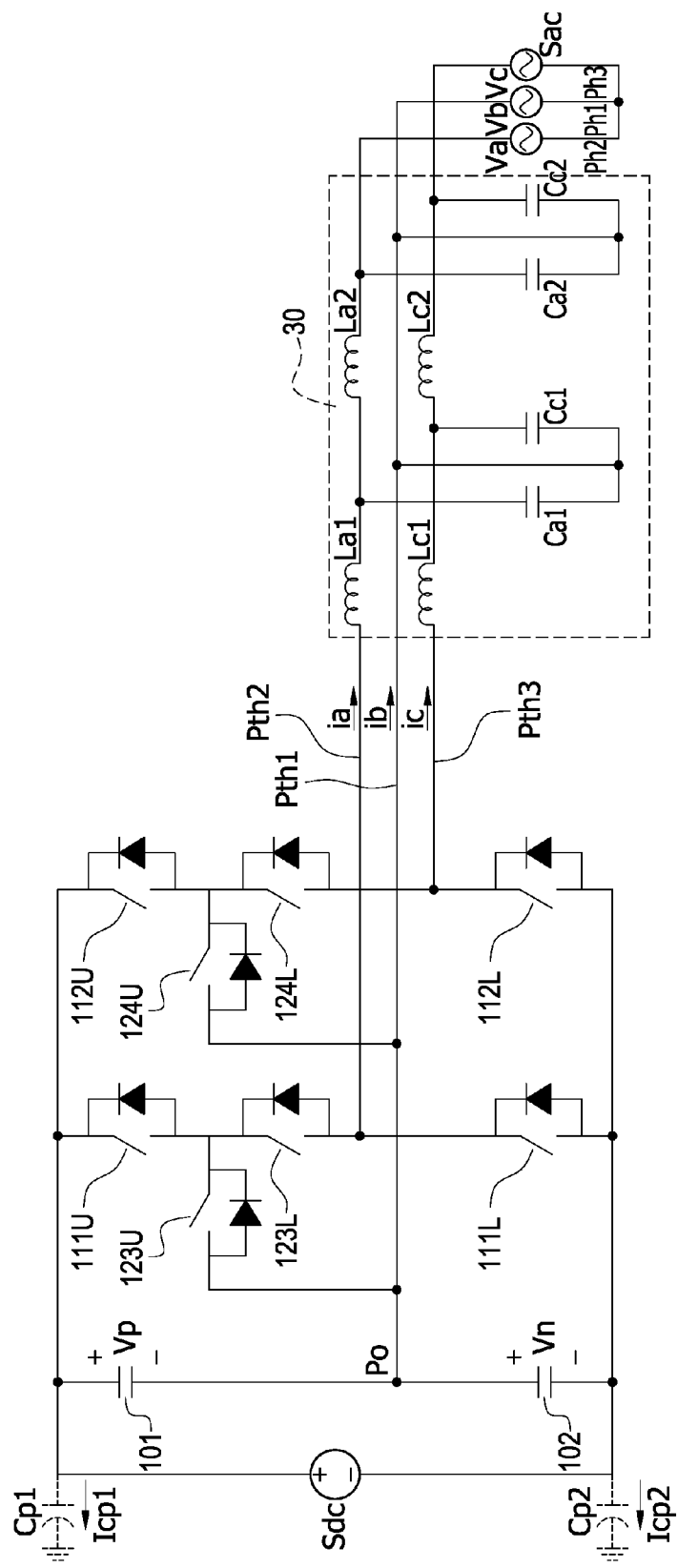
FIG. 8 is a circuit diagram of a DC-to-AC conversion apparatus according to another preferred embodiment of the present disclosure.

Reference is made to FIG. 8 which is a circuit diagram of a DC-to-AC conversion apparatus according to another preferred embodiment of the present disclosure. Because the circuit topology shown in FIG. 8 is essentially identical to that shown in FIG. 3 and the same reference numerals are labeled, the detail description is omitted here for conciseness.

Figure 9:
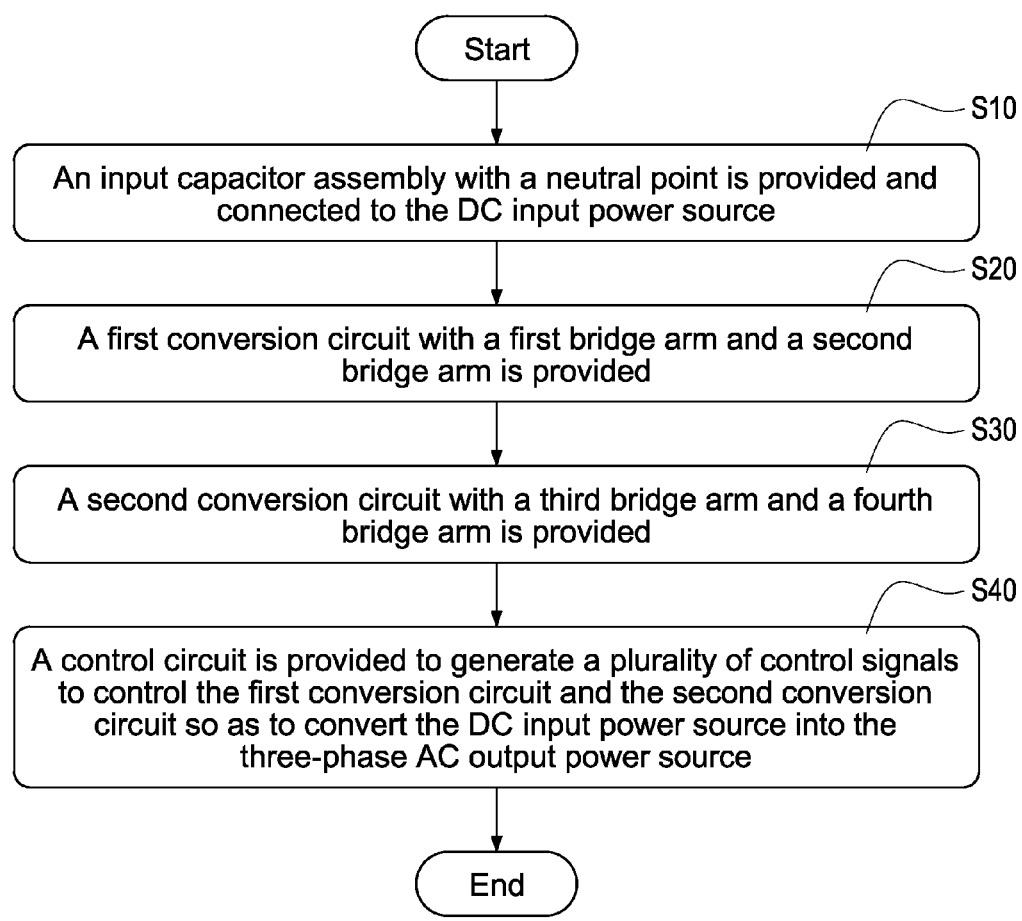
FIG. 9 is a flowchart of a method of operating a DC-to-AC conversion apparatus according to the present disclosure.

Reference is made to FIG. 9 which is a flowchart of a method of operating a DC-to-AC conversion apparatus according to the present disclosure. The DC-to-AC conversion apparatus is provided to convert a DC input power source into a three-phase AC output power source. The method includes steps as follows. First, an input capacitor assembly is provided, and the input capacitor assembly is connected to the DC input power source and the input capacitor assembly has a neutral point. The neutral point is connected to a first phase sequence of the three-phase AC output power source to provide a first path (S10). The input capacitor assembly has a first capacitor and a second capacitor. The first capacitor is connected in series to the second capacitor to receive the DC input power source. In particular, the first capacitor and the second capacitor are connected to a neutral point to maintain a voltage across the first capacitor and a voltage across the second capacitor are equal to a half of a DC input voltage provided by the DC input power source. In particular, the voltage across the first capacitor is a first DC voltage and the voltage across the second capacitor is a second DC voltage.

Afterward, a first conversion circuit is provided, the first conversion circuit has a first bridge arm and a second bridge arm. The first bridge arm has a first upper bridge switch unit and a first lower bridge switch unit connected in series to the first upper bridge switch unit at a first connection point. The second bridge arm has a second upper bridge switch unit and a second lower bridge switch unit connected in series to the second upper bridge switch unit at a second connection point. The first connection point is connected to a second phase sequence of the three-phase AC output power source to provide a second path and the second connection point is connected to a third phase sequence of the three-phase AC output power source to provide a third path (S20).

Afterward, a second conversion circuit is provided. The second conversion circuit has a third bridge arm and a fourth bridge arm. The third bridge arm has a third upper bridge switch unit and a third lower bridge switch unit connected in series to the third upper bridge switch unit to form a first in-series path with a first terminal and a second terminal, and the first terminal is connected to the second path. The fourth bridge arm has a fourth upper bridge switch unit and a fourth lower bridge switch unit connected in series to the fourth upper bridge switch unit to form a second in-series path with a first terminal and a second terminal, and the first terminal is connected to the third path. The second terminal of the first in-series path is connected to the second terminal of the second in-series path and connected to the first path (S30).

Finally, a control circuit is provided to generate a plurality of control signals to control the first conversion circuit and the second conversion circuit so as to convert the DC input power source into the three-phase AC output power source (S40).

In addition, the method further includes providing an output filtering circuit. The output filtering circuit includes a first output inductor assembly, a second output inductor assembly, a first output capacitor assembly, and a second output capacitor assembly. The first output inductor assembly has a first inductor connected on the second path and a second inductor connected on the third path. The second output inductor assembly has a third inductor connected on the second path and a fourth inductor connected on the third path. In particular, the first inductor is connected in series to the third inductor and the second inductor is connected in series to the fourth inductor.

The first output capacitor assembly has a first capacitor connected on the second path and a second capacitor connected on the third path. The second output capacitor assembly has a third capacitor connected on the second path and a fourth capacitor connected on the third path.

The control circuit further has a balance circuit, a fourth arithmetic unit, and a fifth arithmetic unit. The balance circuit has a third arithmetic unit and a proportional-integral (PI) control unit. The third arithmetic unit receives the first DC voltage and the second DC voltage at the DC input side and generates a voltage difference by subtracting the second DC voltage from the first DC voltage. Furthermore, the PI control unit receives the voltage difference to generate a voltage difference signal by executing a proportional and integral operation to the voltage difference. The fourth arithmetic unit receives the a-b phase signal and the voltage difference signal to generate an a-b phase modification signal by subtracting the voltage difference signal from the a-b phase signal. Similarly, the fifth arithmetic unit receives the c-b phase signal and the voltage difference signal to generate a c-b phase modification signal by subtracting the voltage difference signal from the c-b phase signal.

The a-b phase modification signal and the c-b phase modification signal are inputted to the control signal generation circuit to generate the control signals so as to control first conversion circuit and the second conversion circuit, thus maintaining the voltage across the first capacitor and the voltage across the second capacitor accurately equal to a half of the DC input voltage.

In conclusion, the present disclosure has following advantages:

1. The DC-to-AC conversion apparatus is designed to omit the circuit components in one phase so as to reduce the number of switches, output inductors, and output capacitors; and 2. The first conversion circuit and the second conversion circuit are designed to implement the energy-storing and energy-releasing operations, and the balance circuit is used to maintain the voltage across the first capacitor and the voltage across the second capacitor accurately equal to a half of the DC input voltage.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A DC-to-AC conversion apparatus configured to convert a DC input power source into a three-phase AC output power source, the DC-to-AC conversion apparatus comprising:
    an input capacitor assembly connected to the DC input power source and having a neutral point; wherein the neutral point is directly connected to a first phase sequence of the three-phase AC output power source to provide a first path;
    a first conversion circuit having a first bridge arm and a second bridge arm; wherein the first bridge arm has a first upper bridge switch unit and a first lower bridge switch unit connected in series to the first upper bridge switch unit at a first connection point; the second bridge arm has a second upper bridge switch unit and a second lower bridge switch unit connected in series to the second upper bridge switch unit at a second connection point; wherein the first connection point is connected to a second phase sequence of the three-phase AC output power source to provide a second path and the second connection point is connected to a third phase sequence of the three-phase AC output power source to provide a third path;
    a second conversion circuit having a third bridge arm and a fourth bridge arm; wherein the third bridge arm has a third upper bridge switch unit and a third lower bridge switch unit connected in series to the third upper bridge switch unit to form a first in-series path with a first terminal and a second terminal, and the first terminal is connected to the second path; the fourth bridge arm has a fourth upper bridge switch unit and a fourth lower bridge switch unit connected in series to the fourth upper bridge switch unit to form a second in-series path with a first terminal and a second terminal, and the first terminal is connected to the third path; wherein the second terminal of the first in-series path is connected to the second terminal of the second in-series path and directly connected to the first phase sequence; and
    a control circuit configured to generate a plurality of control signals to control the first conversion circuit and the second conversion circuit so as to convert the DC input power source into the three-phase AC output power source.

2. The DC-to-AC conversion apparatus in claim 1, further comprising:
    an output filtering circuit having:
        a first output inductor assembly having a first inductor connected on the second path and a second inductor connected on the third path;
        a second output inductor assembly having a third inductor connected on the second path and a fourth inductor connected on the third path; wherein the first inductor is connected in series to the third inductor and the second inductor is connected in series to the fourth inductor;
        a first output capacitor assembly having a first capacitor connected on the second path and a second capacitor connected on the third path; and
        a second output capacitor assembly having a third capacitor connected on the second path and a fourth capacitor connected on the third path.

3. The DC-to-AC conversion apparatus in claim 2, wherein the control circuit at least comprises a control signal generation circuit, and the control signal generation circuit has:
    a signal inverting unit;
    a first NOT gate unit;
    a second NOT gate unit;
    a first comparison unit has an inverting input terminal, a non-inverting input terminal, and an output terminal; the non-inverting input terminal is configured to receive a phase-to-phase signal and the inverting input terminal is configured to receive a triangular carrier signal; the output terminal is configured to output a first control signal and the output terminal is connected to the first NOT gate unit to output a third control signal; wherein the triangular carrier signal is a high-frequency carrier signal; and
    a second comparison unit has an inverting input terminal, a non-inverting input terminal, and an output terminal; the non-inverting input terminal is connected to the signal inverting unit to receive the phase-to-phase signal and the inverting input terminal is configured to receive the triangular carrier signal; the output terminal is configured to output a second control signal and the output terminal is connected to the second NOT gate unit to output a fourth control signal.

4. The DC-to-AC conversion apparatus in claim 3, wherein the first control signal and the third control signal are complementary high-frequency switching signals, the second control signal is a low-level signal, and the fourth control signal is a high-level signal when a phase-to-phase voltage of the three-phase AC output power source is under a positive half-cycle operation; the second control signal and the fourth control signal are complementary high-frequency switching signals, the first control signal is a low-level signal, and the third control signal is a high-level signal when the phase-to-phase voltage of the three-phase AC output power source is under a negative half-cycle operation.

5. The DC-to-AC conversion apparatus in claim 4, wherein the first upper bridge switch unit is turned on by the first control signal in a high-frequency switching manner, the third upper bridge switch unit is turned off by the third control signal in the high-frequency switching manner, the first lower bridge switch unit is turned off by the second control signal, and the third lower bridge switch unit is turned on by the fourth control signal when the phase-to-phase voltage of the three-phase AC output power source is under the positive half-cycle operation; the first inductor and the third inductor are under an energy-storing operation through a positive half-cycle energy-storing loop sequentially formed by the DC input power source, the first upper bridge switch unit, the first inductor, the third inductor, an a-phase voltage of the three-phase AC output power source, a b-phase voltage of the three-phase AC output power source, the neutral point, and the second capacitor.

6. The DC-to-AC conversion apparatus in claim 4, wherein the first upper bridge switch unit is turned off by the first control signal in a high-frequency switching manner, the third upper bridge switch unit is turned on by the third control signal in the high-frequency switching manner, the first lower bridge switch unit is turned off by the second control signal, and the third lower bridge switch unit is turned on by the fourth control signal when the phase-to-phase voltage of the three-phase AC output power source is under the positive half-cycle operation; the first inductor and the third inductor are under an energy-releasing operation through a positive half-cycle energy-releasing loop sequentially formed by the first inductor, the third inductor, an a-phase voltage of the three-phase AC output power source, a b-phase voltage of the three-phase AC output power source, the third lower bridge switch unit, and the third upper bridge switch unit.

7. The DC-to-AC conversion apparatus in claim 4, wherein the first lower bridge switch unit is turned on by the second control signal in a high-frequency switching manner, the third lower bridge switch unit is turned off by the fourth control signal in the high-frequency switching manner, the first upper bridge switch unit is turned off by the first control signal, and the third upper bridge switch unit is turned on by the third control signal when the phase-to-phase voltage of the three-phase AC output power source is under the negative half-cycle operation; the first inductor and the third inductor are under an energy-storing operation through a negative half-cycle energy-storing loop sequentially formed by the DC input power source, the first capacitor, the neutral point, a b-phase voltage of the three-phase AC output power source, an a-phase voltage of the three-phase AC output power source, the third inductor, the first inductor, and the first lower bridge switch unit.

8. The DC-to-AC conversion apparatus in claim 4, wherein the first lower bridge switch unit is turned off by the second control signal in a high-frequency switching manner, the third lower bridge switch unit is turned on by the fourth control signal in the high-frequency switching manner, the first upper bridge switch unit is turned off by the first control signal, and the third upper bridge switch unit is turned on by the third control signal when the phase-to-phase voltage of the three-phase AC output power source is under the negative half-cycle operation; the first inductor and the third inductor are under an energy-releasing operation through a negative half-cycle energy-releasing loop sequentially formed by the third inductor, the first inductor, the third upper bridge switch unit, the third lower bridge switch unit, a b-phase voltage of the three-phase AC output power source, and an a-phase voltage of the three-phase AC output power source.

9. The DC-to-AC conversion apparatus in claim 3, wherein the phase-to-phase signal is generated by the corresponding phase signals; an a-b phase signal is generated by subtracting a b-phase signal from an a-phase signal and a c-b phase signal is generated by subtracting the b-phase signal from a c-phase signal.

10. The DC-to-AC conversion apparatus in claim 9, wherein the control circuit further comprises:
a balance circuit having:
a third arithmetic unit configured to receive a first DC voltage and a second DC voltage to generate a voltage difference by subtracting the second DC voltage from the first DC voltage; and
a proportional-integral control unit configured to receive the voltage difference to generate a voltage difference signal by executing a proportional and integral operation to the voltage difference;
a fourth arithmetic unit configured to receive the a-b phase signal and the voltage difference signal to generate an a-b phase modification signal by subtracting the voltage difference signal from the a-b phase signal; and
a fifth arithmetic unit configured to receive the c-b phase signal and the voltage difference signal to generate a c-b phase modification signal by subtracting the voltage difference signal from the c-b phase signal;
wherein the a-b phase modification signal and the c-b phase modification signal are inputted to the control signal generation circuit to generate the control signals.

11. A method of operating a DC-to-AC conversion apparatus configured to convert a DC input power source into a three-phase AC output power source, the method comprising:
(a) providing an input capacitor assembly connected to the DC input power source, the input capacitor assembly having a neutral point; wherein the neutral point is directly connected to a first phase sequence of the three-phase AC output power source to provide a first path;
(b) providing a first conversion circuit, the first conversion circuit having a first bridge arm and a second bridge arm; wherein the first bridge arm has a first upper bridge switch unit and a first lower bridge switch unit connected in series to the first upper bridge switch unit at a first connection point; the second bridge arm has a second upper bridge switch unit and a second lower bridge switch unit connected in series to the second upper bridge switch unit at a second connection point; wherein the first connection point is connected to a second phase sequence of the three-phase AC output power source to provide a second path and the second connection point is connected to a third phase sequence of the three-phase AC output power source to provide a third path;
(c) providing a second conversion circuit, the second conversion circuit having a third bridge arm and a fourth bridge arm; wherein the third bridge arm has a third upper bridge switch unit and a third lower bridge switch unit connected in series to the third upper bridge switch unit to form a first in-series path with a first terminal and a second terminal, and the first terminal is connected to the second path; the fourth bridge arm has a fourth upper bridge switch unit and a fourth lower bridge switch unit connected in series to the fourth upper bridge switch unit to form a second in-series path with a first terminal and a second terminal, and the first terminal is connected to the third path; wherein the second terminal of the first in-series path is connected to the second terminal of the second in-series path and directly connected to the first phase sequence; and
(d) providing a control circuit to generate a plurality of control signals to control the first conversion circuit and the second conversion circuit so as to convert the DC input power source into the three-phase AC output power source.

12. The method of operating the DC-to-AC conversion apparatus in claim 11, further comprising:
providing an output filtering circuit, the output filtering circuit having:
a first output inductor assembly having a first inductor connected on the second path and a second inductor connected on the third path;

a second output inductor assembly having a third inductor connected on the second path and a fourth inductor connected on the third path; wherein the first inductor is connected in series to the third inductor and the second inductor is connected in series to the fourth inductor;

a first output capacitor assembly having a first capacitor connected on the second path and a second capacitor connected on the third path; and a second output capacitor assembly having a third capacitor connected on the second path and a fourth capacitor connected on the third path.

13. The method of operating the DC-to-AC conversion apparatus in claim 12, wherein the control circuit at least comprises a control signal generation circuit, and the control signal generation circuit has:

a signal inverting unit;

a first NOT gate unit;

a second NOT gate unit;

a first comparison unit has an inverting input terminal, a non-inverting input terminal, and an output terminal; the non-inverting input terminal is configured to receive a phase-to-phase signal and the inverting input terminal is configured to receive a triangular carrier signal; the output terminal is configured to output a first control signal and the output terminal is connected to the first NOT gate unit to output a third control signal; wherein the triangular carrier signal is a high-frequency carrier signal; and a second comparison unit has an inverting input terminal, a non-inverting input terminal, and an output terminal; the non-inverting input terminal is connected to the signal inverting unit to receive the phase-to-phase signal and the inverting input terminal is configured to receive the triangular carrier signal; the output terminal is configured to output a second control signal and the output terminal is connected to the second NOT gate unit to output a fourth control signal.

14. The method of operating the DC-to-AC conversion apparatus in claim 13, wherein the first control signal and the third control signal are complementary high-frequency switching signals, the second control signal is a low-level signal, and the fourth control signal is a high-level signal when a phase-to-phase voltage of the three-phase AC output power source is under a positive half-cycle operation; the second control signal and the fourth control signal are complementary high-frequency switching signals, the first control signal is a low-level signal, and the third control signal is a high-level signal when the phase-to-phase voltage of the three-phase AC output power source is under a negative half-cycle operation.

15. The method of operating the DC-to-AC conversion apparatus in claim 14, wherein the first upper bridge switch unit is turned on by the first control signal in a high-frequency switching manner, the third upper bridge switch unit is turned off by the third control signal in the high-frequency switching manner, the first lower bridge switch unit is turned off by the second control signal, and the third lower bridge switch unit is turned on by the fourth control signal when the phase-to-phase voltage of the three-phase AC output power source is under the positive half-cycle operation; the first inductor and the third inductor are under an energy-storing operation through a positive half-cycle energy-storing loop sequentially formed by the DC input power source, the first upper bridge switch unit, the first inductor, the third inductor, an a-phase voltage of the three-phase AC output power source, a b-phase voltage of the three-phase AC output power source, the neutral point, and the second capacitor.

16. The method of operating the DC-to-AC conversion apparatus in claim 14, wherein the first upper bridge switch unit is turned off by the first control signal in a high-frequency switching manner, the third upper bridge switch unit is turned on by the third control signal in the high-frequency switching manner, the first lower bridge switch unit is turned off by the second control signal, and the third lower bridge switch unit is turned on by the fourth control signal when the phase-to-phase voltage of the three-phase AC output power source is under the positive half-cycle operation; the first inductor and the third inductor are under an energy-releasing operation through a positive half-cycle energy-releasing loop sequentially formed by the first inductor, the third inductor, an a-phase voltage of the three-phase AC output power source, a b-phase voltage of the three-phase AC output power source, the third lower bridge switch unit, and the third upper bridge switch unit.

17. The method of operating the DC-to-AC conversion apparatus in claim 14, wherein the first lower bridge switch unit is turned on by the second control signal in a high-frequency switching manner, the third lower bridge switch unit is turned off by the fourth control signal in the high-frequency switching manner, the first upper bridge switch unit is turned off by the first control signal, and the third upper bridge switch unit is turned on by the third control signal when the phase-to-phase voltage of the three-phase AC output power source is under the negative half-cycle operation; the first inductor and the third inductor are under an energy-storing operation through a negative half-cycle energy-storing loop sequentially formed by the DC input power source, the first capacitor, the neutral point, a b-phase voltage of the three-phase AC output power source, an a-phase voltage of the three-phase AC output power source, the third inductor, the first inductor, and the first lower bridge switch unit.

18. The method of operating the DC-to-AC conversion apparatus in claim 14, wherein the first lower bridge switch unit is turned off by the second control signal in a high-frequency switching manner, the third lower bridge switch unit is turned on by the fourth control signal in the high-frequency switching manner, the first upper bridge switch unit is turned off by the first control signal, and the third upper bridge switch unit is turned on by the third control signal when the phase-to-phase voltage of the three-phase AC output power source is under the negative half-cycle operation; the first inductor and the third inductor are under an energy-releasing operation through a negative half-cycle energy-releasing loop sequentially formed by the third inductor, the first inductor, the third upper bridge switch unit, the third lower bridge switch unit, a b-phase voltage of the three-phase AC output power source, and an a-phase voltage of the three-phase AC output power source.

19. The method of operating the DC-to-AC conversion apparatus in claim 13, wherein the phase-to-phase signal is generated by the corresponding phase signals; an a-b phase signal is generated by subtracting a b-phase signal from an a-phase signal and a c-b phase signal is generated by subtracting the b-phase signal from a c-phase signal.

20. The method of operating the DC-to-AC conversion apparatus in claim 19, wherein the control circuit further comprises:

a balance circuit having:

a third arithmetic unit configured to receive a first DC voltage and a second DC voltage to generate a voltage difference by subtracting the second DC voltage from the first DC voltage; and a proportional-integral control unit configured to receive the voltage difference to generate a voltage difference signal by executing a proportional and integral operation to the voltage difference;

a fourth arithmetic unit configured to receive the a-b phase signal and the voltage difference signal to generate an a-b phase modification signal by subtracting the voltage difference signal from the a-b phase signal; and a fifth arithmetic unit configured to receive the c-b phase signal and the voltage difference signal to generate a c-b phase modification signal by subtracting the voltage difference signal from the c-b phase signal;

wherein the a-b phase modification signal and the c-b phase modification signal are inputted to the control signal generation circuit to generate the control signals.

* * * * *